Oct. 3, 1950 T. A. KEEN 2,524,387
KEY CONTROLLED TYPE SELECTION
Filed April 5, 1945 6 Sheets-Sheet 1

INVENTOR.
THOMAS A. KEEN
BY Irving C. Roemer
ATTORNEY

Oct. 3, 1950

T. A. KEEN 2,524,387

KEY CONTROLLED TYPE SELECTION

Filed April 5, 1945

INVENTOR.
THOMAS A. KEEN
BY
Irving C Roemer
ATTORNEY

INVENTOR.
THOMAS A. KEEN
BY Irving C. Roemer
ATTORNEY

Oct. 3, 1950

T. A. KEEN 2,524,387

KEY CONTROLLED TYPE SELECTION

Filed April 5, 1945

INVENTOR.
THOMAS A. KEEN
BY
Irving C. Roemer
ATTORNEY

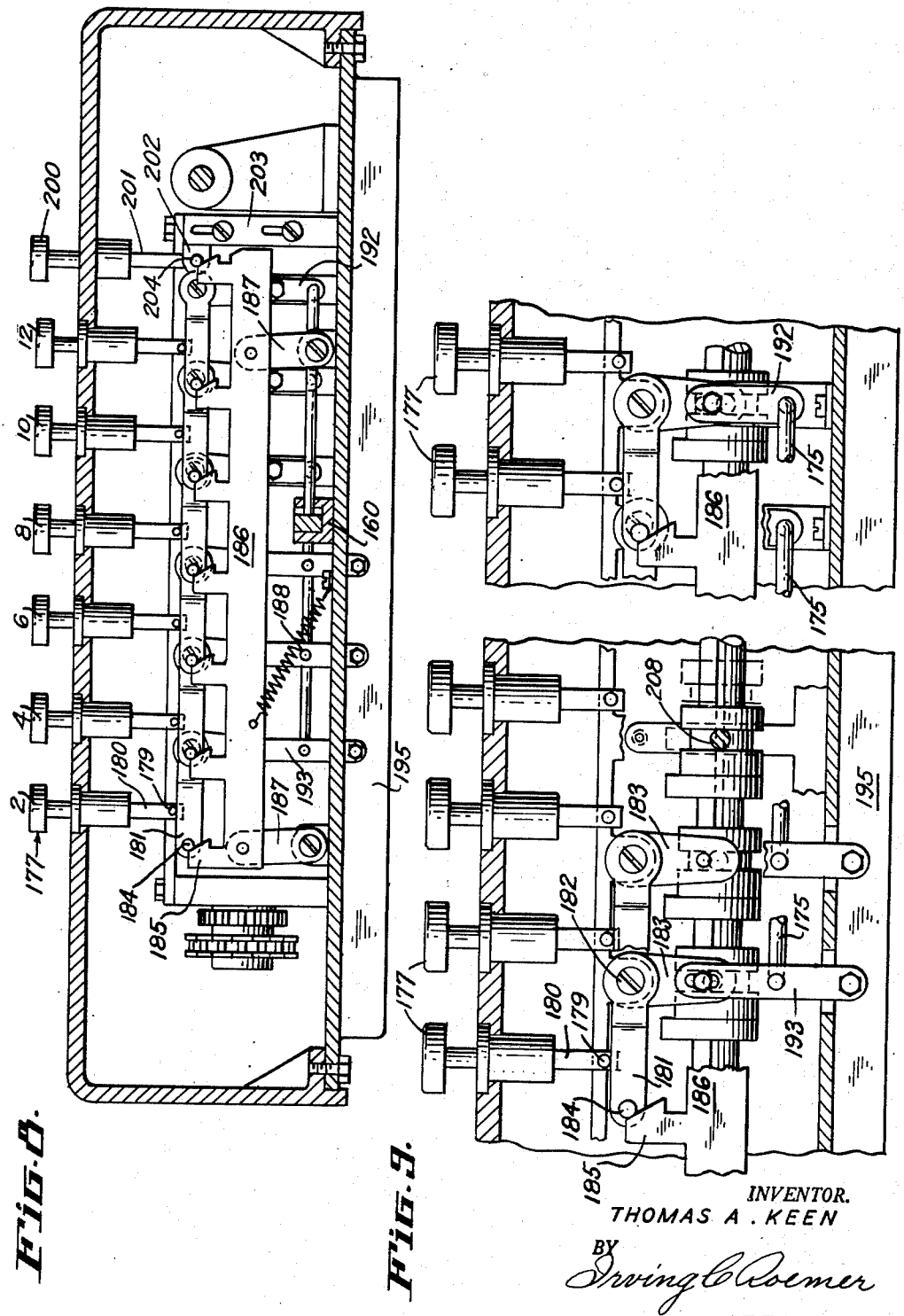

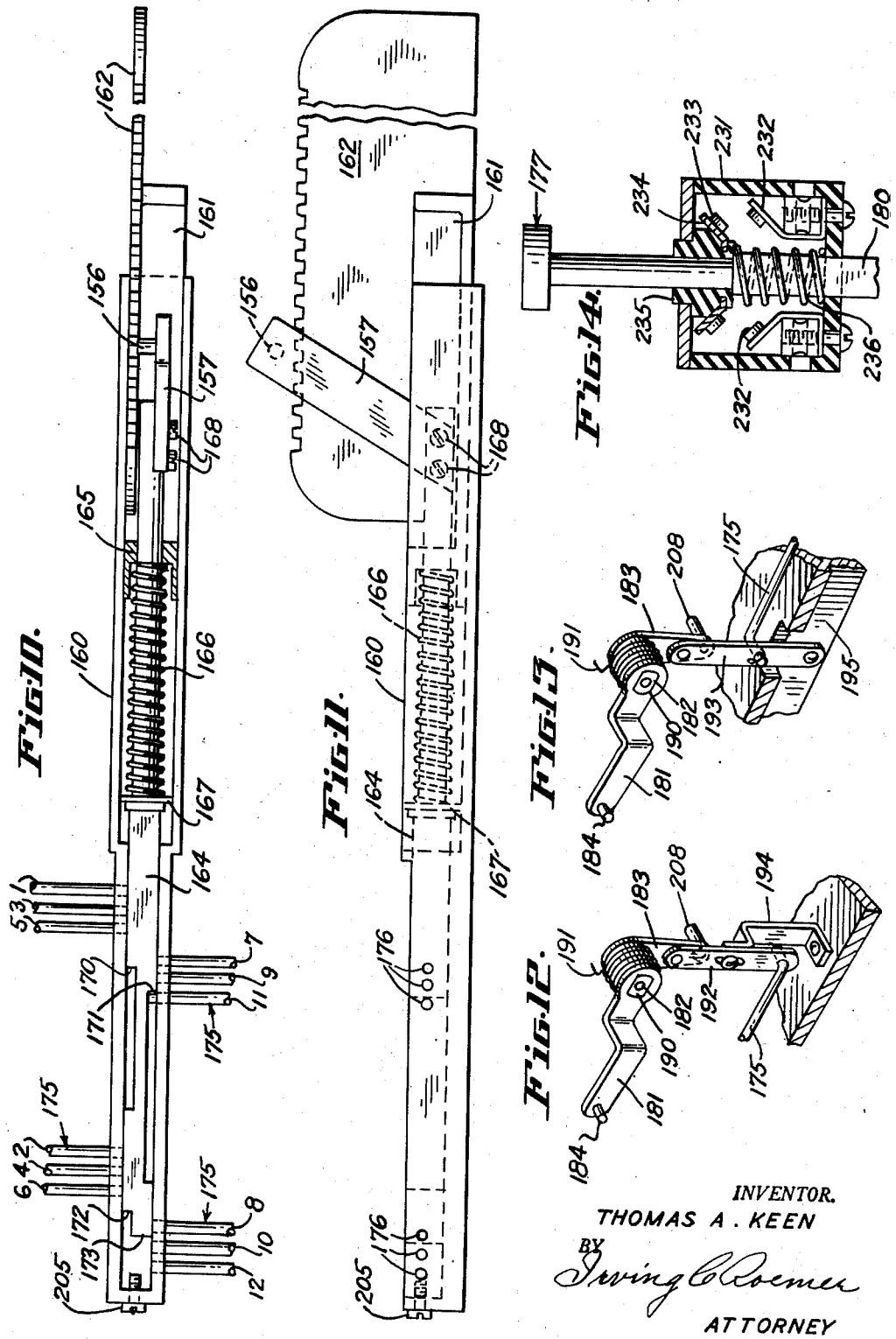

Patented Oct. 3, 1950

2,524,387

UNITED STATES PATENT OFFICE 2,524,387

KEY CONTROLLED TYPE SELECTION

Thomas A. Keen, San Mateo, Calif., assignor of one-half to Hannah M. Smith, Chicago, Ill.

Application April 5, 1945, Serial No. 586,764

4 Claims. (Cl. 101—93)

The present invention relates to key controlled type selecting mechanism and particularly to mechanism of the kind which may be used, for example, in ticket printing and issuing mechanisms of the kind in common use for printing and selling tickets representing wagers on entries in a horse race or the like.

The machine which is disclosed in the present application as an illustration of the manner in which the key controlled type selection mechanism of the present invention is employed is substantially the same as that shown in United States Letters Patent No. 2,299,396 which issued to Thomas A. Keen and James Kilburg on October 20, 1942. This machine is one which includes a ticket printing mechanism and key board controlled mechanism for selectively setting the type thereof and for initiating a ticket printing and issuing operation of the machine. The individual keys on the key board are numbered to correspond with the numbers which identify the participants or entries in a race and depression of any one key effects setting of the printing mechanism and operation of the machine to print and issue a ticket bearing the number of the key depressed. The present application is particularly concerned with the mechanism through which the keys on the key board effect selective operation of the printing mechanism in such a machine though it should be understood that the general construction of the machine itself aside from this mechanism does not constitute a part of the present invention and the description and illustration of the general assembly of the ticket printing machine referred to herein is made for purposes of illustrating the invention which is adaptable to use with other types of ticket printing machines, and in fact to various other kinds of machines wherein control of a type member is accomplished through a key board.

It is the object of the present invention to provide a simple and positively operating means for effecting selection of type to be printed by a type member in response to depression of keys which correspond to multiple type faces on said member. It is also an object of this invention to provide mechanism wherein such type selection is effected by simple mechanical movements and with a minimum of heavy and rapidly moving parts so that selections may be made in quick succession without undue vibration or mechanical stress which result in excessive noise and wear on mechanical parts involved. Further and more specific objects of the invention are made apparent in the following specification wherein reference is made to the accompanying drawings illustrating the invention in a preferred form.

In the drawings:

Fig. 8 is a transverse section through the front part of the machine showing in front elevation one row of keys on the key board and the mechanism controlled thereby;

Fig. 9 is an enlarged fragmentary view of the keys and control mechanism shown in Fig. 8 with parts broken away to disclose further details of construction;

Fig. 10 is a plan view on an enlarged scale of a portion of the key controlled type selecting mechanism illustrated in Figs. 2 and 3;

Fig. 11 is a view in side elevation of the mechanism shown in Fig. 10;

Fig. 12 is a perspective view of a portion of the key controlled mechanism illustrating details of construction thereof;

Fig. 13 is a similar view of an alternate form of the same mechanism; and

Fig. 14 is an enlarged view of one of the keys on the key board illustrating in vertical section an electric switch which is actuated upon depression of the key.

Figure 1:
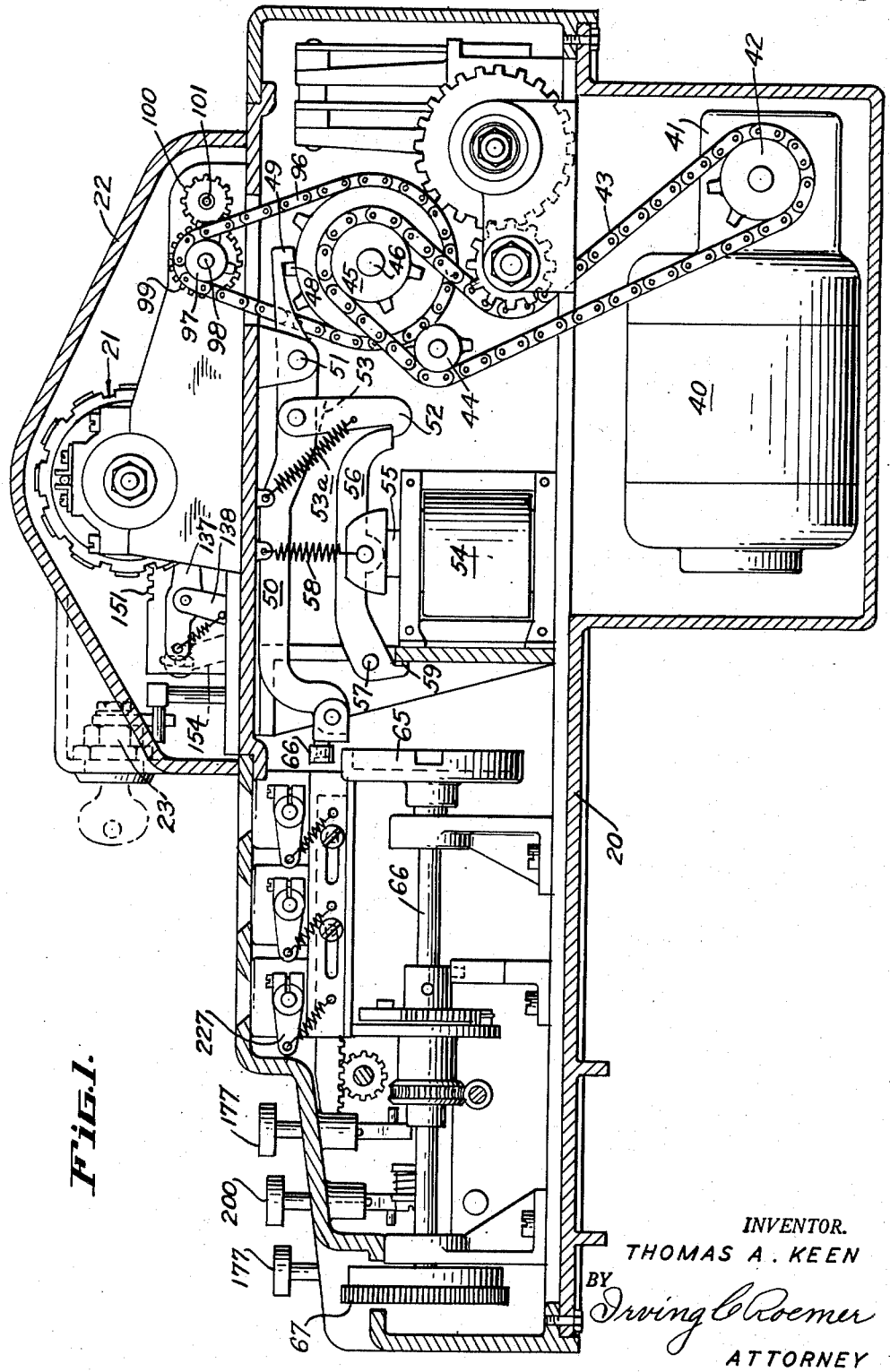
Fig. 1 is a vertical longitudinal sectional view taken through a ticket printing and issuing machine which includes the type selection mechanism to which the present invention pertains.
Figure 2:
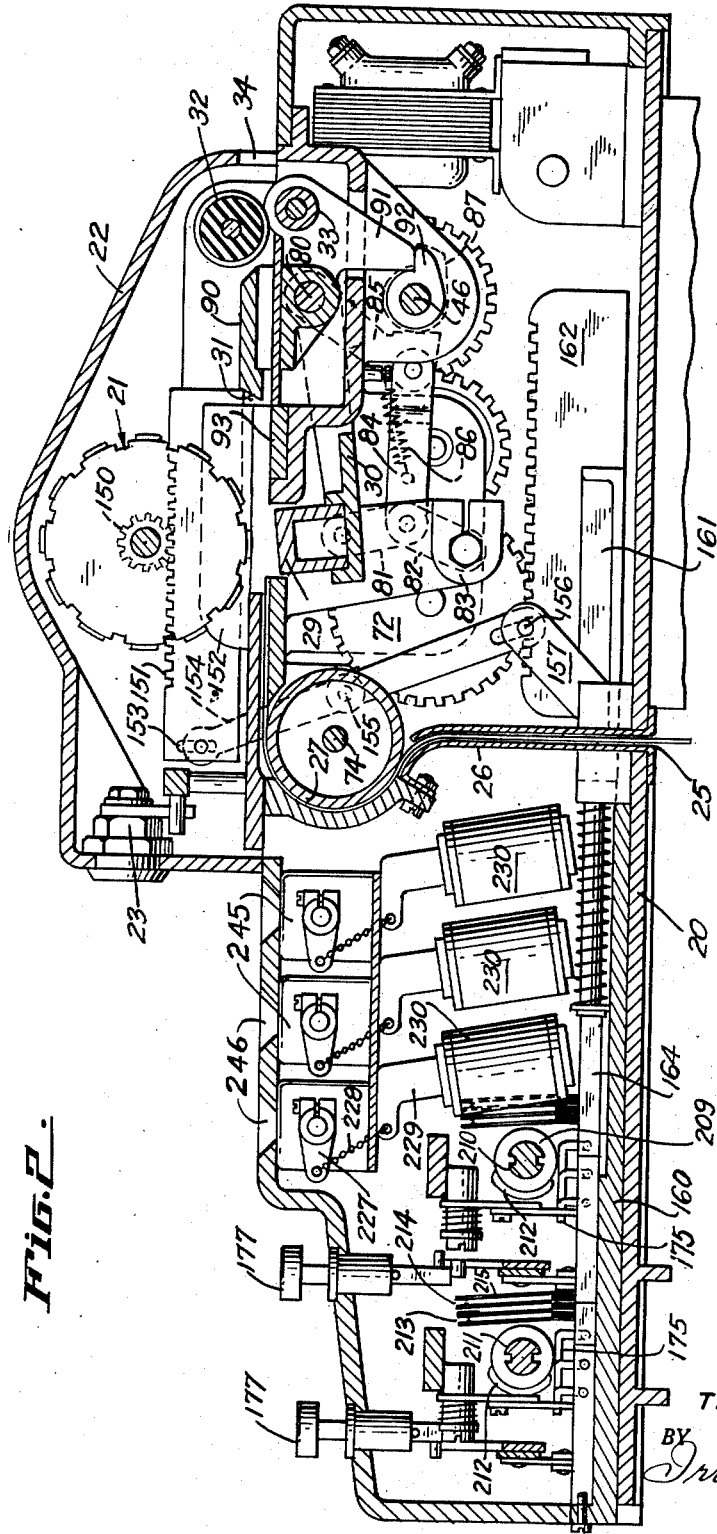
Fig. 2 is a similar view taken through another part of the same machine to illustrate certain mechanism not disclosed in Fig. 1.
Figure 3:
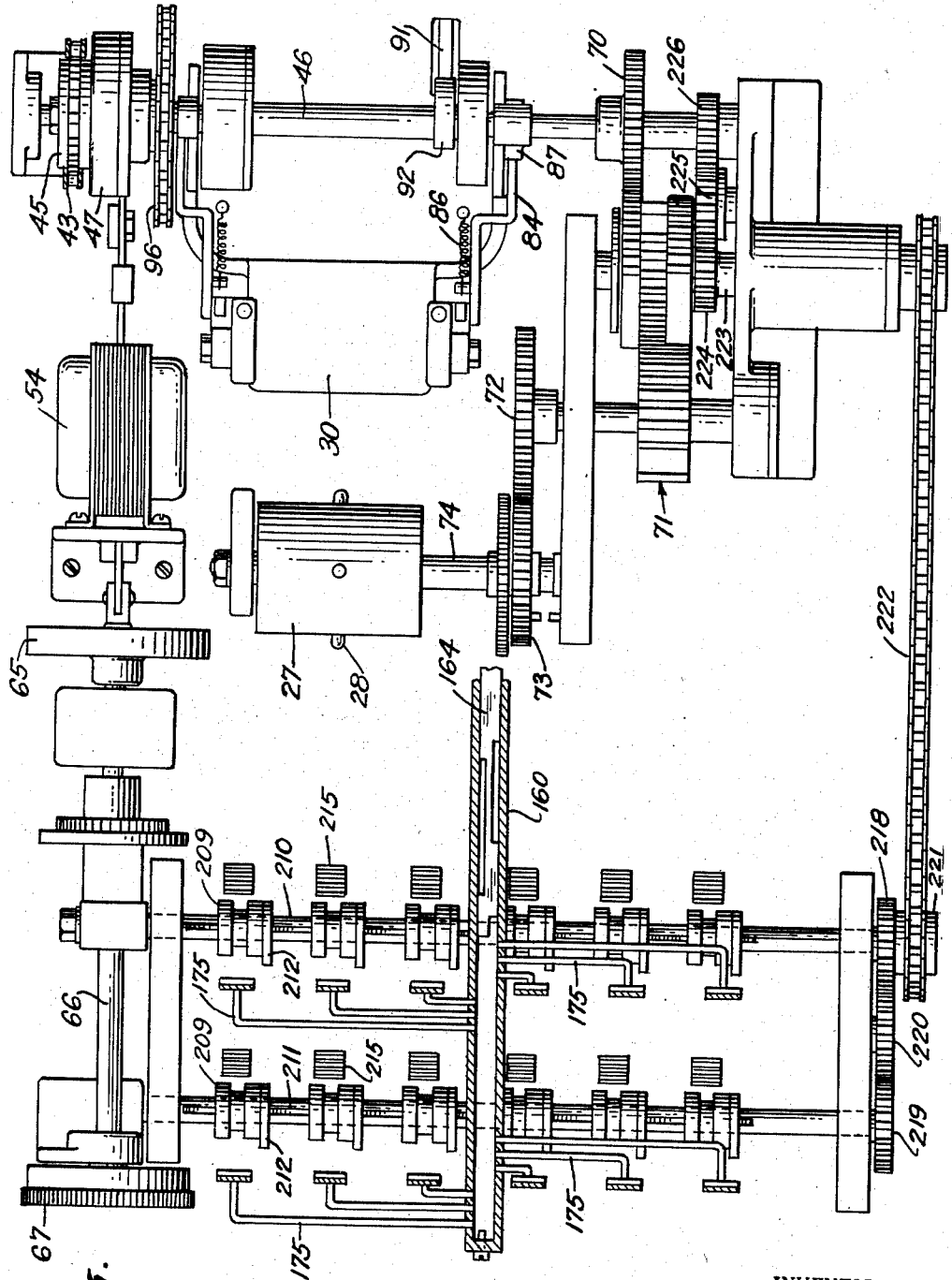
Fig. 3 is an inverted plan view of a portion of the machine illustrating the main power transmission mechanism and certain phases of the type selection mechanism.

Referring first to Figs. 1, 2 and 3, the ticket printing mechanism in connection with which the present invention is to be described is shown as contained in a housing illustrated at 20. A printing head generally indicated at 21 is disposed on top of this housing and enclosed by a cover plate 22 which is removable for the purpose of making adjustments to the printing head but normally retained in place by a key controlled locking mechanism 23. The printing head 21 is of a cylindrical type made up of a plurality of multifaced type discs adjustably supported with relation to the shaft which supports the head, as will hereinafter be described in detail. A ticket strip or web of paper upon which tickets are printed is advanced beneath the printing head 21 upon actuation of the machine. As best shown in Fig. 2, the ticket strip enters the housing 20 from a suitably positioned supply roll (not shown) through a slot 25 formed in the bottom of the housing and passes upwardly through guides 26 and then over a feed roller 27 (see also Fig. 3) which feed roller has driving pins 28 for registry with suitably spaced perforations in the ticket strip in order to advance it a ticket length for each ticket printing operation of the machine. After passing over the feed roller 27, the ticket passes horizontally beneath the printing head 21 so that it may be pressed upwardly against the printing head whereby the impression of selected type is made upon the ticket. A platen 29 supported on an arm 30 is pressed upwardly against the ticket strip to force it against the type characters on the printing head in properly timed relation to the operation of the machine, and after the printing has been accomplished, the strip is advanced by operation of the feed drum 27 and the printed ticket is sheared by a knife 31. As it is sheared, it is grasped between a pair of ejecting rollers 32 and 33 which advance it out of the housing through a slot 34 provided for that purpose.

The entire operation of the machine is under control of the keys on the key board so that upon depression of any key a type disc on the printing head is ejected to print an entry number corresponding to the number of the key depressed. At the same time a single cycle clutch is conditioned to effect a complete ticket printing and issuing operation and a counter is actuated to register the sale of a ticket on the entry selected. For a general understanding of the mechanism controlled by the key board, reference is again made to Fig. 1 wherein an electric motor 40 is illustrated as the source of power for the ticket printing and issuing mechanism. Through reduction gearing contained in a gear box 41 on the motor, a sprocket 42 is continuously driven to operate a chain 43 which passes over an idler sprocket 44 and a driven sprocket 45 which rotates freely on a main shaft 46, also shown in Fig. 3. The driven sprocket 45 is adapted to be connected for driving engagement with the shaft 46 by means of a single cycle clutch contained in a clutch housing 47. This clutch includes a radially extending lug which appears at 48 in Fig. 1 and the hooked end 49 of a lever 50 normally engages behind this lug and prevents engagement of the clutch. Upon raising of the hooked end 49 of the lever to clear the lug 48, the clutch engages and drives the main shaft through a single complete cycle or until the lug 48 again comes into contact with the end of the lever. The lever 50 is pivoted as at 51 and carries a downwardly extending pivoted pawl 52. A spring 53 urges the pawl to the left as viewed in Fig. 1 and to a position substantially perpendicular to the lever 50 at which position it stops by reason of a shoulder 53 which engages the bottom of the lever. The pawl thus normally assumes the position illustrated, but is free to swing to the right against the tension of the spring 53a. A solenoid 54 has a retractible armature 55 pivoted to a lever 56 which is in turn pivoted as at 57 at one end and engages with the pawl 52 at its opposite end. A spring 58 tends to hold the armature and the lever 56 upwardly in a position limited by a stop tail 59 on the lever. When the solenoid 54 is energized, which occurs upon depression of one of the keys on the key board, its armature is retracted and through the lever 56 and pawl 52 the lever 50 is swung about its pivot 51 to raise its end 49 free of the lug 48. The end of the pawl 52 swings away from the lever 56 during this operation so that a single cycle operation of the clutch is insured even though the operator should fail promptly to release the key which effects energization of the solenoid. The details of construction of the clutch 47 are clearly shown and described in Patent No. 2,299,396 referred to above though other types of single cycle clutches may be used for this purpose. It is sufficient to an understanding of the present invention that the operation of the clutch 47 effects a single complete rotation of the main shaft 46.

There is also as illustrated in Fig. 1, a mechanism for effecting sale in rapid succession of a predetermined number of tickets upon a single depression of any key. This mechanism comprises a notched drum 65 adapted to engage a pivoted tail 66 on the lever 50 to retain the lever in its depressed or lowered position. The drum 65 is carried at one end of a shaft 66, the opposite end of which is fitted with a control dial 67 operable from the exterior of the machine, but a further description of the construction and operation of this mechanism is not essential to an understanding of the present invention.

When the main shaft 46 operates through a single cycle, it drives the ticket feeding drum 27 a distance sufficient to advance the ticket strip the length of one ticket. This is accomplished through a gear 70 on the main shaft, as shown in Fig. 3, which meshes with and drives a set of Geneva gears, shown at 71, which impart intermittent rotation to a gear 72 which meshes with and drives a gear 73 on the shaft 74 to which the drum 27 is secured. This motion of the ticket strip, of course, takes place after the printing operation and just before the printed ticket is sheared and ejected from the machine.

The same motion of the main drive shaft 46 also operates the platen 29 to press the ticket strip upwardly against the type faces on the printing head. This is accomplished through the mechanism illustrated in Fig. 2 wherein the arm 30 which supports the platen 29 is shown as pivotally supported on a pin 80. A pair of toggle links 81 and 82 are normally disposed in a buckled position as illustrated and form a connection between the platen supporting arm 30 and a fixed bracket 83. The central pivoted connection of the toggle links is connected by a link 84 with an arm 85 which is also pivotally supported by the pin 80. These parts are held in their normal position with the platen lowered as indicated at Fig. 2. by a spring 86. A cam shown in dotted lines at 87 engages the arm 85 upon rotation of the shaft 46 to which the cam is secured and, through the medium of the link 84, urges the toggle links 81 and 82 to a straight line position so that the platen 29 forcibly engages the ticket strip above it and presses it into firm contact with the type on the printing head.

Depression of a shear heead 90 which carries the knife 31 is also effected during rotation of the shaft 46. This shear head 90 is supported for rocking movement about the pin 80 and it carries a tail 91 which is engageable by a cam 92 fixed to the shaft 46. Upon rotation of the shaft, this cam engages the tail 91 of the shear head to rock it and cause the knife 31 to cooperate with a hardened steel insert shown at 93 to shear the ticket strip. The idler roll 33 is also carried by the tail of the shear head 90 and upon the rocking movement described this idler presses the sheared ticket upwardly into engagement with the rotating ejector roller 32 so that the sheared ticket is advanced through the delivery slot 34. The ejector roller 32 is driven as illustrated in Fig. 1 by a chain 96 driven from a main shaft sprocket and driving a small sprocket 97 on a shaft 98 which also carries a gear 99 meshing with and driving a gear 100 fixed to a shaft 101 which also carries the ticket ejecting roller 32.

Figure 4:
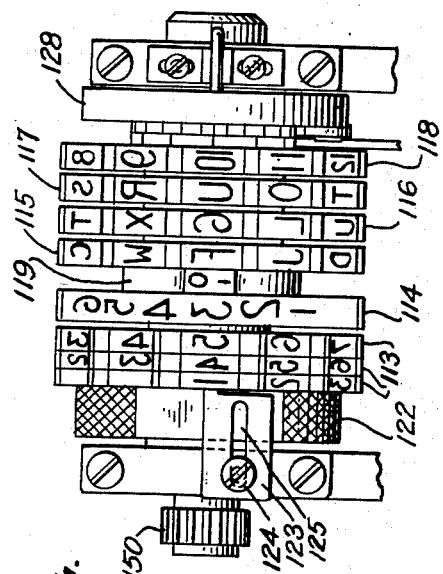
Fig. 4 is a plan view of a printing head which forms a part of the machine.
Figure 5:
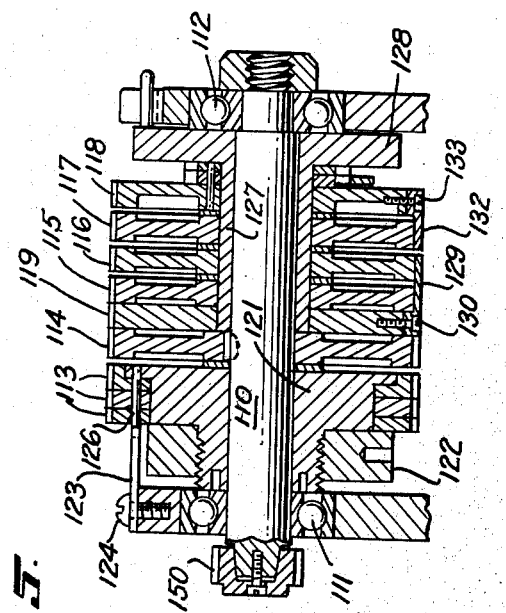
Fig. 5 is a central vertical section of the same printing head.

The details of construction of the printing head 21 are illustrated in Figs. 4 to 7 inclusive. In Figs. 4 and 5 the head is shown as mounted on a shaft 110 rotatably supported in bearings 111 and 112. The shaft carries a plurality of printing discs which may be identified as three date discs 113, and an entry disc 114, three code discs 115, 116, 117 and a race disc 118. Intermediate the entry disc 114 and the code disc 115 is positioned a type member 119 bearing one number only such as the number "10" shown to indicate the number of the particular machine of a group by which the ticket was printed. All of the discs are normally free of any connection with the shaft 110 with the exception of the entry disc 114 which is keyed to the shaft for rotation thereby so that it may be set to print a different entry number for each ticket. The date discs 113 for example are all rotatably mounted as shown in Fig. 5 on a hub 121 which surrounds the shaft 110 and they are retained against endwise removal from the hub by a knurled nut 122. From day to day the position of the date disc may be adjusted to bring their type faces into position to print the proper date upon actuation of the printing mechanism. The individual date discs are locked in their set position with respect to the stationary hub 121 by means of a key 123 clamped in place by a screw 124 which passes through a slot 125 in the key. The key 123 carries a pin 126 which is disposed in perforations in the discs which are in registry with each other and with a perforation in the hub member 121 as best shown in Fig. 5. Upon loosening of the screw 124 and retraction of the key, the pin 126 is withdrawn from these perforations to permit rotatable adjustment of the date discs.

Figure 6:
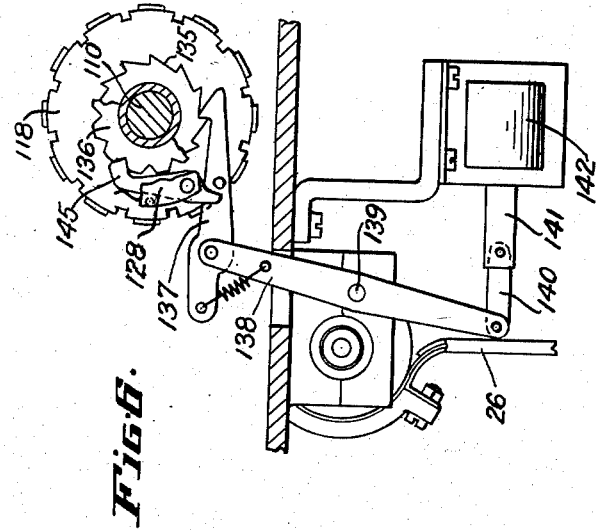
Fig. 6 is a view in end elevation of a portion of the type setting mechanism employed in conjunction with the printing head shown in Figs. 4 and 5.
Figure 7:
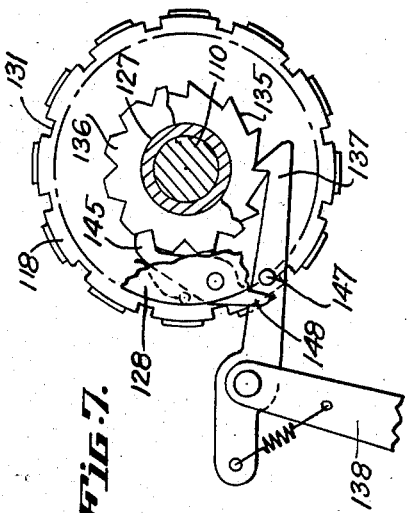
Fig. 7 is an enlarged view of the part of the mechanism illustrated in Fig. 6.

The three code discs 115, 116 and 117, the race disc 118 and the type member 119 are all carried by a tubular support 127 through which the shaft 110 passes and which is formed with a radially extending annular flange 128 at its outer end. The member 119 which prints the machine number is fixed to the type 127 in any suitable manner and the first two code discs 115 and 116 are locked in their adjusted position by a key 129 fixed to the member 119 by a screw 130. This key is in the form of a small metal tongue adapted to be disposed within the grooves 131 (Fig. 7) formed between the type faces on the discs. The third code disc 117 is connected with the race disc 118 in a similar manner by means of a key 132 which is secured to the race disc 118 by a screw 133 and has a tongue portion extending into one of the slots 131 of the code disc 117. Hence, when a ticket is printed, it bears the number of a race printed by the race disc and it also bears three code letters or symbols, two of which are printed by discs 115 and 116 and remain the same throughout the day or until manual adjustment of the disc positions has been made. The other code symbol printed by the disc 117 changes with each race because of its connection with the disc which prints the race number. Consequently, the code symbols which appear with each race number are unknown to the purchaser of a ticket until the time when the race commences and the fraudulent production of spurious tickets in advance of the race time is therefore impossible. The race number is changed at the start of each race by an electric switch usually disposed in the calculating room or at any other suitable point remote from the machines and not under control of the individual machine operators. The mechanism for changing the race number and its single associated code symbol by an electric impulse is illustrated in Figs. 6 and 7 wherein the race disc 118 is shown as having secured to its side, as also illustrated in Fig. 5, a ratchet wheel 135 and a notched detent wheel 136. The ratchet wheel 135 is engaged by a spring pressed pawl 137 pivoted to the upper end of a lever 138 which rocks about a central pivot 139. The lower end of the lever 138 is connected by a link 140 with a retractable armature 141 operated by a solenoid 142. The solenoid 142 is energized by a circuit which may be closed by operation of a switch at any desired remote location so that upon retraction of its armature, the lever 138 is swung about its central pivotal support and the pawl 137 engages the ratchet 135 to advance it and the race disc to which it is attached one step or a distance corresponding to the spacing between the consecutive numbers on the type faces of the race disc. In order to insure registry of the type faces in their printing position upon each setting of the race disc, a detent pawl 145 which is pivoted to the flange 128 is urged by a spring 146 into one of the notches of the detent wheel 136. The notches on the wheel 136 are spaced identically with the teeth of the ratchet 135 and the centers of the type faces on the race disc. The tension of the spring 146 is sufficiently light to permit the detent wheel to rotate upon turning of the race wheel, though it tends to hold the disc in its properly centered printing position. In order positively to prevent the detent pawl from over-riding the notch in which it is intended to stop, a pin 147 is provided on the pawl 137 in a position to engage a tail 148 on the detent pawl when the pawl 137 is in its fully retracted position. The presence of this pin in engagement with the tail of the pawl positively retains it in the proper notch of the detent wheel until the pawl 137 returns to normal position and there is no further tendency for it to override.

The entry disc 114 which is directly connected with the shaft 110 must be changed upon the sale of each ticket, and this is effected by rotation of the shaft to bring the type face corresponding to the number of the selected entry to its printing position. To accomplish this gear 150 is secured to the end of the shaft 110 and this gear meshes as best shown in Fig. 2 with a rack 151 supported in a guide 152 for horizontal sliding movement. The forward end of the rack 151 is connected by a pin and slot connection 153 with the upper end of a lever 154 which is centrally supported for pivotal movement at 155 and which has its lower end connected by the pin and slot 156 with an arm 157. Upon operation of the machine, the arm 157 moves back and forth in a direction to effect swinging of the lever 154 and consequently reciprocation of the rack 151 so that the entry disc is rotated. The degree of rotation of the entry disc and the type face thereon presented for printing is determined by depression of the keys on the key board which are numbered to correspond to the type faces on the entry disc. The mechanism through which this is accomplished is illustrated in Figs. 2, 3, 8, 10 and 11, wherein an elongated guide track or slide 160 is shown as secured to the bottom of the case 20. This slide is rectangular in cross section and open at its top, and in its rear portion carries a slide block 161 to which is secured an upstanding rack 162 which, as best illustrated in Fig. 2, meshes with the gear 72 which oscillates upon each machine operation through the medium of the Geneva gears as hereinbefore described. Therefore, upon each operation of the machine, the rack and the sliding member 161 to which it is secured moves forwardly and rearwardly in the slide 160. The sliding member 161 is disposed in the rear end of the slide 160 and in its forward end is a control bar 164 which is rectangular in cross section at its forward portion and cylindrical toward its rear. The rear portion of the control bar 164 extends through an opening in the front end of the member 161, as indicated at 165 in Fig. 10. A compression spring 166 is interposed between the forward end of member 161, and a collar 167 on the control bar 164 so that upon forward movement of the member 161, the bar 164 tends to move forwardly the same distance. The forward movement of the control bar may be interrupted at any point and the difference in movement of the two parts is absorbed by the spring 166. The arm 157 which operates the lever 154 is connected to the rear end of the member 164 as by screws 168 as shown in Figs. 10 and 11 so that the exact distance of the forward movement of the control bar 164 is translated into a corresponding movement of the rack 151 which rotates the entry disc 114 of the printing head. In order to limit this forward movement of the member 164 to correspond with the particular key depressed on the key board, it is provided with recesses on its opposite sides to provide a shoulder 170 which functions in conjunction with keys 1, 3 and 5, a shoulder 171 for keys 7, 9 and 11, and a shoulder 172 for keys 2, 4 and 6, while its end 173 functions with keys 8, 10 and 12. The depression of any key causes a stop pin generally indicated at 175 to project through suitably spaced perforations 176 in the sides of the slide 160 for cooperation with one of the shoulders 170, 171 or 172, or the end 173. The stop pins 175 are individually numbered with reference characters from one to twelve inclusive, which will be of assistance in identifying them with the particular keys by which they are operated, as well as with the entry numerals which appear on the entry disc of the printing head. When any one of the entry keys 177 shown in Figs. 8 and 9 is depressed, a pin 179 on the lower end of its stem 180 engages the horizontal arm 181 of a bell crank lever which is pivoted at 182 and has a vertical arm 183, as also shown in Figs. 9, 12 and 13. When the horizontal arm 181 swings downwardly, a pin 184 at its end engages beneath a latch 185 on a latch bar 186 which is supported on a parallel link 187 to permit it to swing to the left. A spring 188 normally holds the latch bar in its right-hand position. The bell crank is therefore held in its depressed position until another key is depressed to swing the latch bar to the left, thereby releasing the first bell crank and engaging its own bell crank in depressed position. The vertical arm 183 of the bell crank is connected with the horizontal arm 181 through a bushing 190 and a spiral spring 191 disposed about said bushing tends to retain the bell crank in its normal position. The vertical arm 183 is connected with one of the stop pins 175 by a centrally pivoted lever 192, as shown in Fig. 12, or by an end pivoted lever 193, as shown in Fig. 13. Whether this connection is made by the lever shown at 192 or that shown at 193 depends upon whether the key which operates it is on the left-hand or the right-hand side of the machine as in either case the stop pin 175 must be moved toward the center in order that its end will be projected into the centrally positioned slide 160. The lever 192 as shown in Fig. 12 is supported by a bracket 194 fixed to the bottom plate of the casing 20 and the lever 193 as shown in Figs. 8 and 13 is pivoted at its lower end to a bar 195 secured to the under surface of the bottom of the casing which casing bottom is suitably perforated to permit the levers to extend downwardly to their point of pivotal support. Consequently the depression of any one of the keys from one to twelve effects movement of its corresponding stop pin 175 toward the center of the machine so that its end is projected as illustrated in Fig. 10, in connection with the stop pin 11, into the slide 160 in a position to cooperate with its associated shoulder 170, 171, 172 or 173. Thus when the member 164 is moved forwardly it is stopped at a point depending upon the key depressed and, through the arm 157, it moves the lever 154 and rack 151 a distance sufficient to bring the proper numeral on the entry disk to printing position just before the plate 29 presses the ticket strip upwardly against the printing head.

In addition to the keys 177 which are arranged in two rows and numbered from one to twelve there is provided a try key, the purpose of which is to effect the printing of a ticket and test the operation of the machine before actual sale of tickets commences, the ticket so printed will be marked with a "T" instead of the usual entry number, and this trial character occupies the thirteenth position of the entry disk 114. This try key 200 as shown in Fig. 8 has a stem 201 which upon depression of the key engages with a bracket 202 on a vertically guided slide 203 so that a pin 204 becomes engaged beneath one of the latches 185 on the latch bar 186. Operation of the try key 200 does not affect any of the stop pins 175 but permits the control bar 164 to move forwardly to its full limit where it engages with an adjustable stop member in the form of a screw 205 in the forward end of the slide 160 as shown in Figs. 10 and 11 and this movement of the control bar corresponds to the try position of the entry disk on the printing head. The control mechanism in conjunction with the keys one to twelve inclusive comprises two sets of the apparatus shown in Fig. 8, there being one for each row of keys in the key bank, but as they are substantially identical the foregoing description of one will suffice.

It is required that the sale of each ticket be registered on a counting device corresponding to the particular entry for which the ticket was issued and it is also required that the sale of a ticket on any entry be accompanied by the production of an electric impulse which may be transmitted to totalizing apparatus for the purpose of determining the ratio of sales on any one entry to the total sales so that the odds payable upon a winning entry may readily be calculated. This is accomplished through the mechanism illustrated in Figs. 8, 9, 12 and 13 wherein the vertical arm 183 of each of the key actuated bell cranks is shown as provided with a rearwardly extending pin 208. This pin projects into the groove of a collar 209 which is slidably mounted and splined to either of a pair of transversally extending shafts 210 or 211. The collar 209 carries an integrally formed cam 212 at one side and directly behind each of the collars 209 in its normal position are a pair of switches 213 and 214 made up of contact members carried on spring arms 215 and adapted to be simultaneously closed by engagement with the spring arms of the cam 212 upon rotation of the shaft 210 or 211. In the normal position of the several collars 209 the cams 212 are out of alignment with the switches as shown in Fig. 3. Depression of any one of the keys, however, slides the corresponding collar 209 on the shaft to bring the cam into alignment with the switch. A ticket printing operation of the machine then rotates the shafts 210 and 211 and the aligned cam closes the switches 213 and 214 one of which sends an impulse to suitable totalizing mechanism and the other of which closes a circuit to a counter corresponding to the number of the entry upon which the ticket was issued. Rotation of the shafts 210 and 211 is effected through mechanism illustrated in Fig. 3 wherein these shafts are shown as provided with driving gears 218 and 219 respectively, connected by an intermediate idler 220. Sprocket 221 also mounted on the shaft 210 is driven by a chain 222 from a sprocket on a stub shaft 223 which has a gear 224 driven through an idler gear 225 by a gear 226 on the main shaft 46. Thus upon each operation of the main shaft the shafts 210 and 211 are turned through one complete rotation and whichever cam 212 on either of these shafts has been aligned with its corresponding switches by depression of a key will close those switches to send an impulse to the totalizer and to actuate a counter associated with that particular machine. The counters employed for this purpose are of a conventional mechanical type as shown at 245 in Fig. 2 with their reading visible through sight openings 246 suitably positioned in the casing 20. Each counter has an actuating arm 227 connected as by a chain 228 with the armature 229 of an electromagnet 230 and the electromagnet corresponding to the key depressed is energized to retract its armature and actuate the counter which corresponds to the entry for which a ticket has been issued.

The circuit which energized the solenoid 54 for control of the main clutch must be closed upon depression of any key and this is preferably accomplished by a switch such as that shown in Fig. 14 wherein the stem 180 of the key 177 is shown as extending through a housing 231. A pair of contact members 232 are arranged within this housing and are bridged by contact members 233 supported by a metallic member 234 which is carried by a bushing 235 fixed to the key stem. A key return spring 236 is also advantageously contained within the housing 231.

I claim:

1. Apparatus for selective setting of motor driven printing mechanism responsive to depression of keys on a keyboard which comprises, an elongated channel shaped guide, a control bar slidable in said guide and resiliently urged upon each motor driven printing operation to undergo a full stroke in the guide, means connecting the control bar with the printing mechanism for positioning of type on said mechanism, and means including stop pins operable upon depression of keys on said keyboard to enter said guide and interrupt the stroke of the control bar at points effecting setting of type corresponding to the key depressed.

2. Apparatus for selective setting of motor driven printing mechanism responsive to depression of keys on a keyboard which comprises, an elongated channel shaped guide, a control bar slidable in said guide and resiliently urged upon each motor driven printing operation to undergo a full stroke in the guide, means connecting the control bar with the printing mechanism for positioning of type on said mechanism, said control bar having shoulders formed at spaced points intermediate its ends, and means including stop pins operable upon depression of keys on said keyboard to enter said guide and act on said shoulders to interrupt the stroke of said control bar at points effecting setting of type corresponding to the key depressed.

3. Apparatus for selective setting of motor driven printing mechanism responsive to depression of keys on a keyboard which comprises, an elongated guide, a bar slidable in said guide and operable through a full reciprocal stroke upon each cycle of the motor driven printing mechanism, a second bar slidable in the guide and connected with the printing mechanism to control setting of type thereon, a resilient connection between said bars whereby the first bar urges the control bar through a full stroke but permits stopping of the control bar at various type setting positions and key controlled stops slidable through the guide to intercept the control bar.

4. Apparatus for selective setting of motor driven printing mechanism responsive to depression of keys on a keyboard which comprises, an elongated guide, a bar slidable in said guide and operable through a full reciprocal stroke upon each cycle of the motor driven printing mechanism, a second bar slidable in the guide and connected with the printing mechanism to control setting of type thereon, and a resilient connection between said bars whereby the first bar urges the control bar through a full stroke but permits stopping of the control bar at various type setting positions and key actuated means for stopping the control bar at said positions.

THOS. A. KEEN.

REFERENCES CITED

The following references are of record in the file of this patent:

UNITED STATES PATENTS

| Number | Name | Date |
| --- | --- | --- |
| 1,142,079 | Cleal | June 8, 1915 |
| 2,082,282 | Garbell | June 1, 1937 |
| 2,141,577 | Watson | Dec. 27, 1938 |
| 2,150,761 | Craig | Mar. 14, 1939 |
| 2,272,079 | Anderson | Feb. 3, 1942 |
| 2,299,396 | Keen | Oct. 20, 1942 |
| 2,345,212 | Nelson | Mar. 28, 1944 |
| 2,348,789 | Crossman | May 16, 1944 |
| 2,380,257 | Pasinski | July 10, 1945 |
| 2,389,823 | Smith | Nov. 27, 1945 |
| 2,418,027 | Gubelmann | Mar. 25, 1947 |